(12) United States Patent
Arai

(10) Patent No.: US 12,651,363 B2
(45) Date of Patent: Jun. 9, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kimitaka Arai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 18/484,328

(22) Filed: Oct. 10, 2023

(65) Prior Publication Data

US 2024/0135568 A1     Apr. 25, 2024

(30) Foreign Application Priority Data

Oct. 11, 2022     (JP) ................................. 2022-163433

(51) Int. Cl.
| | |
|---|---|
| *G06T 7/60* | (2017.01) |
| *G06T 7/13* | (2017.01) |
| *G06T 7/70* | (2017.01) |
| *G06V 10/60* | (2022.01) |
| *G06V 10/74* | (2022.01) |

(52) U.S. Cl.
CPC .................. *G06T 7/60* (2013.01); *G06T 7/13* (2017.01); *G06T 7/70* (2017.01); *G06V 10/60* (2022.01); *G06V 10/761* (2022.01)

(58) Field of Classification Search
CPC .... G06T 7/60; G06T 7/13; G06T 7/70; G06V 10/60; G06V 10/761; G06V 10/766; G06V 20/69
See application file for complete search history.

(56) References Cited

U.S. PATENT DOCUMENTS

| | | | |
|---|---|---|---|
| 10,896,516 B1 * | 1/2021 | Kantor ...................... | G06T 7/74 |
| 2018/0365847 A1 * | 12/2018 | Miyata ...................... | G06T 7/60 |
| 2022/0005213 A1 * | 1/2022 | Ikeda ...................... | G06T 19/00 |

FOREIGN PATENT DOCUMENTS

| | | | |
|---|---|---|---|
| CN | 113435423 | * | 9/2021 |
| JP | 4917351 | * | 4/2012 |
| JP | 2017017330 A | | 1/2017 |

OTHER PUBLICATIONS

Machine translation for JP 4917351 (Year: 2012).*
Machine translation for CN 113435423 (Year: 2021).*

* cited by examiner

*Primary Examiner* — Qian Yang
(74) *Attorney, Agent, or Firm* — Canon U.S.A., Inc. IP Division

(57) ABSTRACT

An image processing apparatus acquires an image obtained by capturing a plurality of linear images with different line widths generated on a surface of an object, selects a linear image from among the plurality of linear images in the image, and evaluates a state of the surface of the object based on the selected linear image.

15 Claims, 17 Drawing Sheets

Passage 3

Passage 4

Serial Passaging and Fisetin Treatments

Passage 6

Passage 8

Passage 10

| % Reduction | | |
|---|---|---|
| | H3K9 | H2AX |
| YF p4 | 23% | 22% |
| YF p18 | 55% | 63% |
| OF p4 | 26% | 29% |
| OF p18 | 25% | 2% |
FIGURE 5A
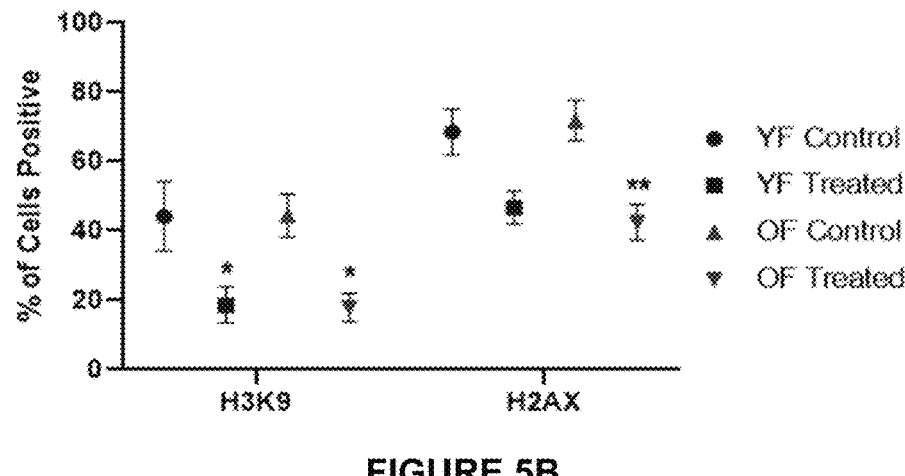
FIGURE 5B
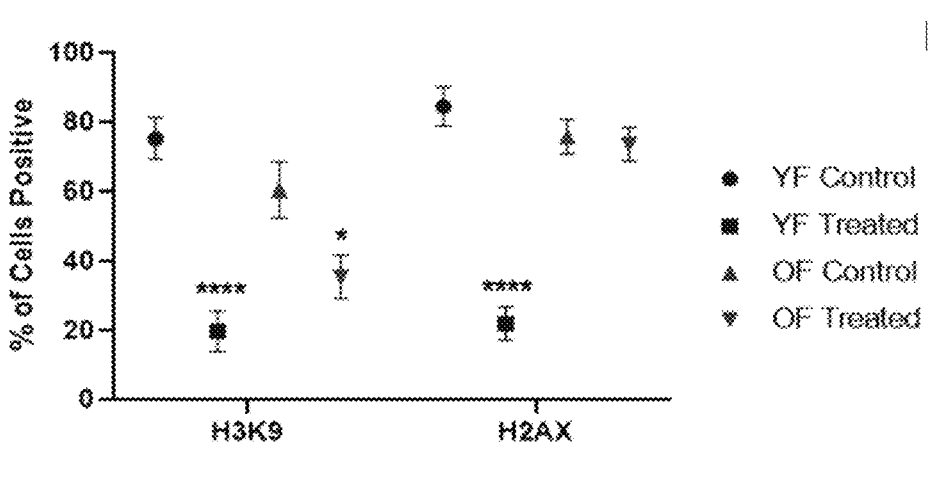
FIGURE 5C

| % Senescence | | |
|---|---|---|
| ID | Mid Stage | Late Stage |
| P05 | 24.64 | 3.46 |
| P25 | 23.49 | 6.27 |

IMAGE PROCESSING APPARATUS, IMAGE PROCESSING METHOD, AND STORAGE MEDIUM

BACKGROUND

Field of the Disclosure

The present disclosure relates to technology for evaluating the state of an object surface.

Description of the Related Art

In the field of industrial design, the surface state of an object contributes to its designability, and it is therefore important to evaluate the surface state of the object. Japanese Patent Laid-Open No. 2017-17330 discloses a method of projecting illumination light onto an object surface, photographing the object surface, on which the illumination light has been projected, with a camera, and evaluating the orange peel on the object surface based on the feature amount of a projection image in the photographed image.

However, as in Japanese Patent Laid-Open No. 2017-17330, in the case of evaluating the state of an object surface using camera photographing, the evaluation value may fluctuate depending on the relative position of the object with the illumination light source and the camera, which makes it difficult to accurately evaluate the state of the object surface.

SUMMARY

The present disclosure provides technology for accurately evaluating the state of an object surface.

Some embodiments of an image processing apparatus of the present disclosure include: one or more memories and one or more processors. The one or more processors and the one or more memories are configured to acquire an image obtained by capturing a plurality of linear images with different line widths generated on a surface of an object, select a linear image from among the plurality of linear images in the image, and evaluate a state of the surface of the object based on the selected linear image.

Further features of various embodiments will become apparent from the following description of exemplary embodiments with reference to the attached drawings.

BRIEF DESCRIPTION OF THE DRAWINGS

FIG. 5 is a diagram illustrating a state transition of the UI.

FIG. 12 is a diagram illustrating an example of data of an optical profile.

FIG. 13 is a diagram illustrating a configuration example of an image processing apparatus according to a second embodiment.

FIG. 14 is a flowchart illustrating an orange peel evaluation process according to the second embodiment.

FIG. 15 is a diagram illustrating an example of a data table storing line width information.

FIGS. 16A and 16B are diagrams illustrating a slit pattern of an illumination light source.

DESCRIPTION OF THE EMBODIMENTS

Figure 1A:
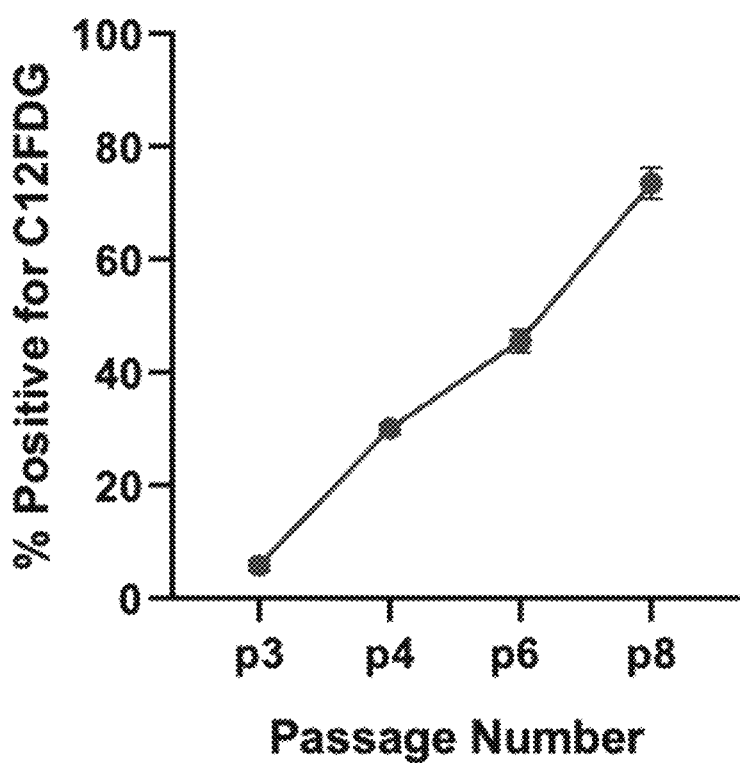
FIGS. 1A and 1B are diagrams illustrating a configuration example of an image processing apparatus according to a first embodiment.

Hereinafter, embodiments of the present disclosure will be described with reference to the drawings. It should be noted that the following embodiments are not necessarily construed to limit every embodiment of the present disclosure. In addition, not all of the combinations of features described in the present embodiments are essential to the solution of every embodiment of the present disclosure.

First Embodiment

In a first embodiment, an orange peel that appears on the surface of an object is evaluated. Orange peel is a state where there are subtle irregularities on the surface of an object. For example, when painting the exterior of a product, such as a vehicle body, the paint painted using a spray gun or the like may solidify before it becomes flat and smooth on the body surface. In this case, subtle irregularities occur on the body surface. This state is called orange peel, and unlike a smooth surface that has been intended, orange peel reduces the designability of the product.

In the present embodiment, slit light is projected onto the surface of an object, a projection image on the surface of the object is captured with a camera, and then the orange peel on the surface of the object is evaluated based on the feature amount of the projection image in the captured image. In this evaluation method, even if an object to be evaluated is identical, the evaluation value fluctuates depending on the relative position of the object with the illumination light source and the imaging device. Due to this fluctuation in the evaluation value, the magnitude relationship of evaluation values that had been established under a certain distance condition for two objects with different orange peels may be inverted when the distance condition changes. In a product conveyor line, because the width (in the case of a car, the width of the car) varies depending on the type of product being conveyed, fluctuations in the distance condition are inevitable. One of the factors of the evaluation value fluctuations is that the angle range of incident light relative to the object surface may change depending on the distance from the object to the illumination light source, and the luminance distribution of the projection image may vary.

The inventors have experimentally found that it is possible to avoid the inversion of the magnitude relationship of the evaluation values as described above by changing the slit width according to the distance condition, by utilizing the fact that the luminance distribution of the projection image varies according to the slit width. Accordingly, an image processing system according to the present embodiment includes an illumination light source, an imaging device, and an image processing apparatus, and uses the illumination light source to project a plurality of slit light beams having different line widths onto the surface of an object, and uses the imaging device to capture projection images on the object surface. The image processing apparatus then selects a projection image according to information about the object from among the projection images in the captured image, and calculates an evaluation value from the selected projection image. The following description assumes a situation where an object is being conveyed on a conveyor line. The conveying direction is a direction that intersects the width direction of the object. The illumination light source projects slit light onto the object surface from a direction that intersects the conveying direction. Hereinafter, the present embodiment will be described using FIGS. 1 to 12.

Hardware Configuration of Image Processing Apparatus

FIG. 1A is a block diagram illustrating the hardware configuration of an image processing apparatus 1. The image processing apparatus 1 includes a central processing unit (CPU) 101, a read-only memory (ROM) 102, and a random-access memory (RAM) 103. The image processing apparatus 1 also includes a video card (VC) 104, a general-purpose interface (I/F) 105, a serial advanced technology attachment (SATA) OF 106, and a network interface card (NIC) 107. These components 101 to 107 are interconnected via a system bus 108, and the CPU 101 controls these components 101 to 107 via the system bus 108. Processing according to later-described flowcharts is realized by the CPU 101 executing programs stored in the ROM 102, a hard disk drive (HDD) 113, etc. using the RAM 103 as a work memory.

A display 115 is connected to the VC 104. An input device 110, such as a mouse and a keyboard, and an imaging device 111 are connected to the general-purpose OF 105 via a serial bus 109. The HDD 113 and a general-purpose drive 114 that reads and writes various recording media are connected to the SATA OF 106 via a serial bus 112. The NIC 107 inputs and outputs information to and from an external device. The CPU 101 uses the HDD 113 and various recording media mounted on the general-purpose drive 114 as storage locations for various types of data. The CPU 101 displays a user interface (UI), provided by a program, on the display 115 and receives input, such as user instructions, via the input device 110. Also, a touchscreen display in which the input device 110 and the display 115 are integrated may be used.

Functional Configuration of Image Processing Apparatus

Figure 1B:
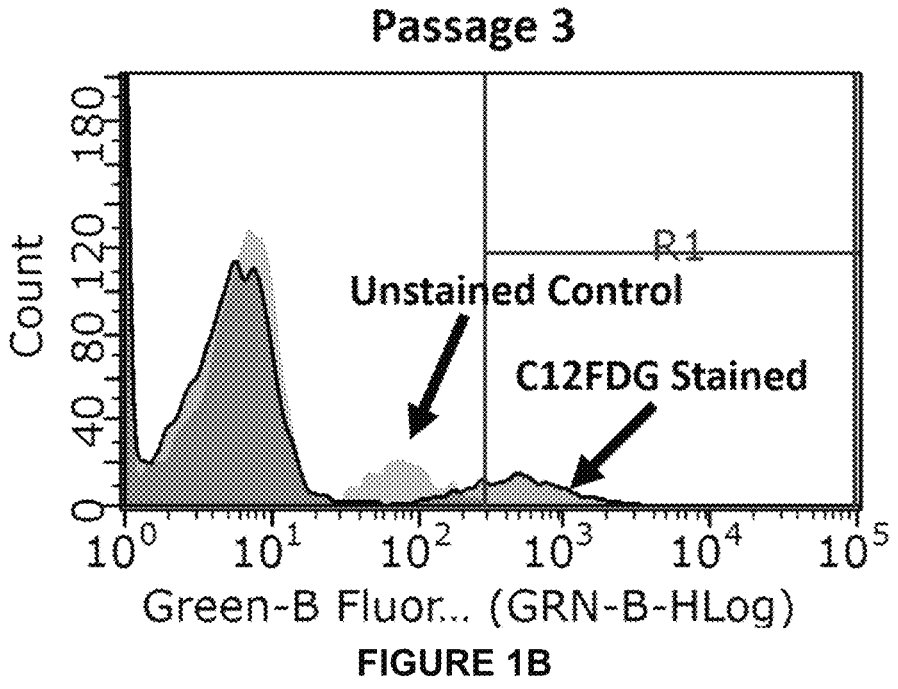
Figure 1C:
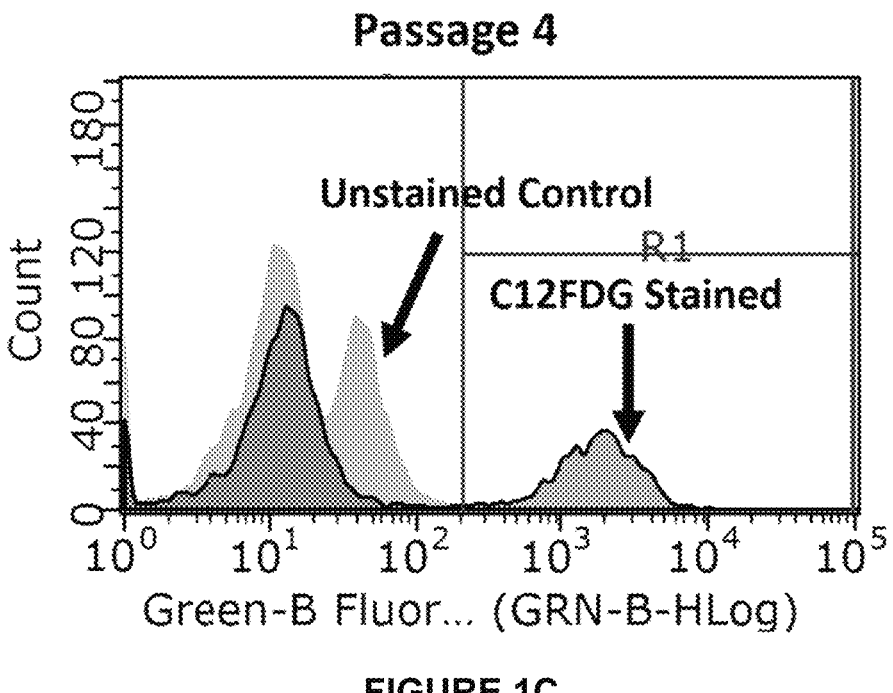
Figure 1D:
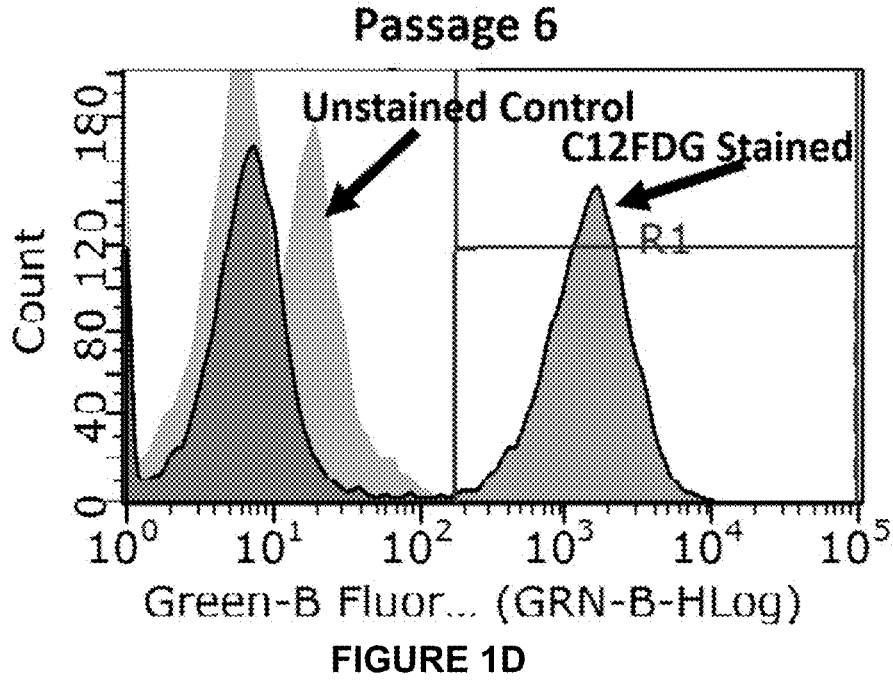
Figure 1E:
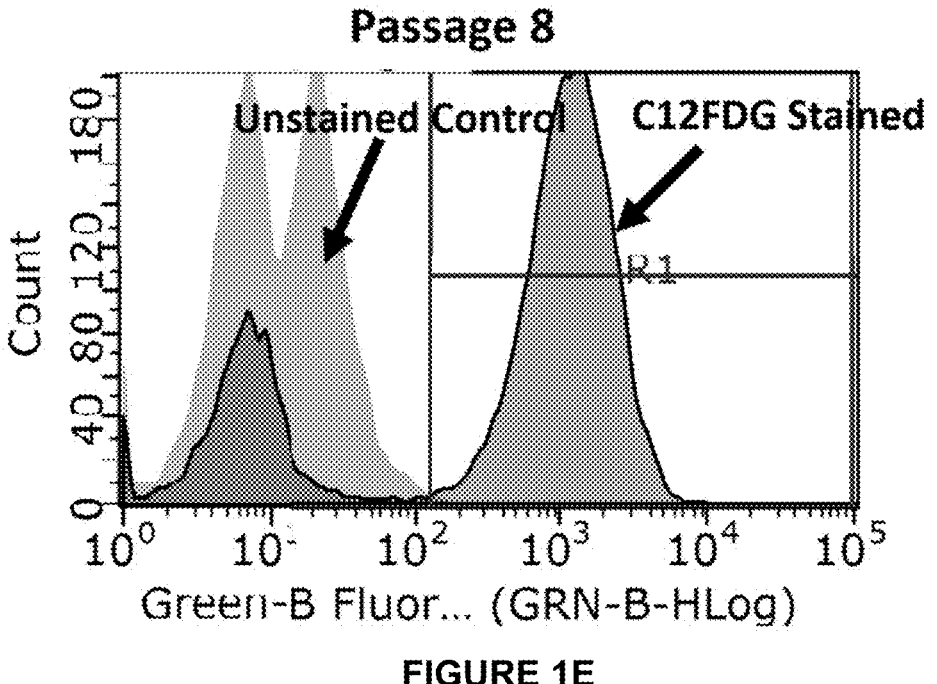

FIG. 1B is a diagram illustrating the functional configuration of the image processing apparatus 1. The CPU 101 functions as function units illustrated in FIG. 1B by reading out and executing programs stored in the ROM 102, the HDD 113, etc. using the RAM 103 as a work memory. It is not necessary for all of the processes discussed below to be executed by the CPU 101, and the image processing apparatus 1 may be configured such that some or all of the processes are performed by one or more processing circuits other than the CPU 101.

The image processing apparatus 1 includes an image acquisition unit 1001, a line width information acquisition unit 1002, a projection image width calculation unit 1003, a projection image selection unit 1004, an evaluation value calculation unit 1005, an evaluation value output unit 1006, and a display control unit 1007.

The image acquisition unit 1001 acquires image data obtained by capturing an image of an object to be evaluated from the HDD 113. This image data contains a plurality of projection images with different line widths formed on the surface of the object to be evaluated.

Figure 6:
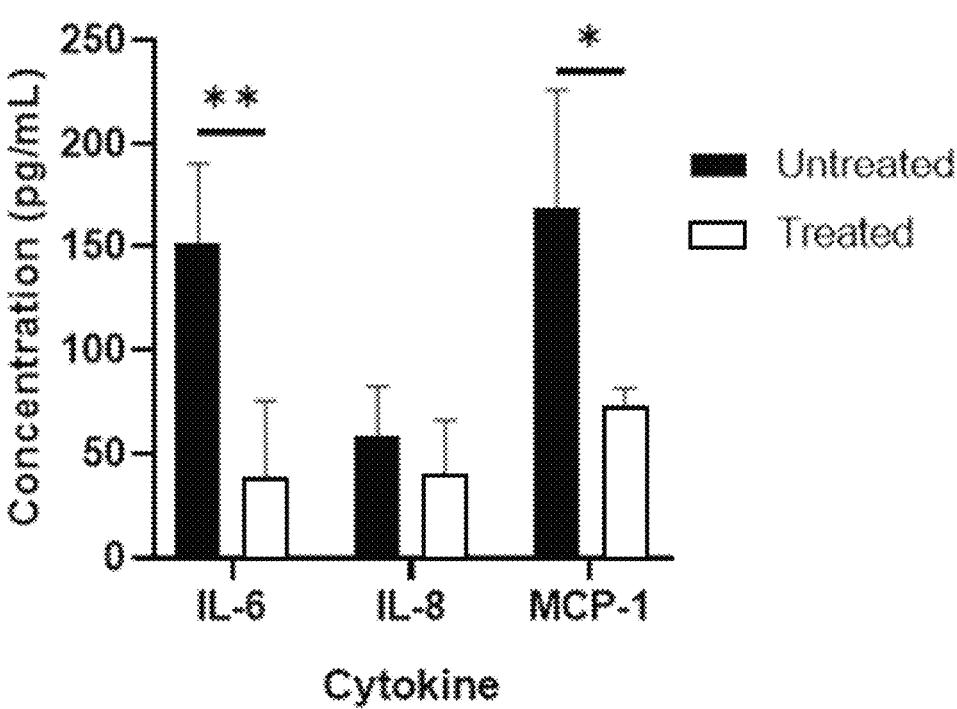
FIG. 6 is a diagram illustrating an example of a data table storing line width information.

The line width information acquisition unit 1002 acquires object information, which is production management information of the object being conveyed, and acquires line width information corresponding to the acquired object information. In the present embodiment, the object information includes the object type and the paint color, but is not limited thereto. The HDD 113 stores a data table (hereinafter referred to as a line width information data table) that stores line width information as illustrated in FIG. 6. The line width information data table holds the correlation between object information and line width information.

In the present embodiment, the line width information acquisition unit 1002 acquires line width information corresponding to object information from the line width information data table. Note that the method using a data table is not the only possible method, and line width information may be acquired using a learning model trained to output suitable line width information on receipt of various types of information about the object type, paint color, distance between the object and the illumination light source, distance between the object and the imaging device, and the like.

The projection image width calculation unit 1003 calculates the line width of each projection image based on the image data acquired by the image acquisition unit 1001.

The projection image selection unit 1004 compares the line width information acquired by the line width information acquisition unit 1002 with the line width of each projection image calculated by the projection image width calculation unit 1003, and selects a projection image to be used for evaluation based on the result of the comparison.

The evaluation value calculation unit 1005 acquires an optical profile from the projection image selected by the projection image selection unit 1004, of the image data acquired by the image acquisition unit 1001, and calculates an evaluation value of orange peel from the optical profile.

The evaluation value output unit 1006 outputs the evaluation value calculated by the evaluation value calculation unit 1005 to the display 115 and the HDD 113.

The display control unit 1007 applies control to display the UI for orange peel evaluation (FIG. 4) on the display 115. The display 115 is an example of a display unit.

Processing Executed by Image Processing Apparatus 1

Figure 2A:
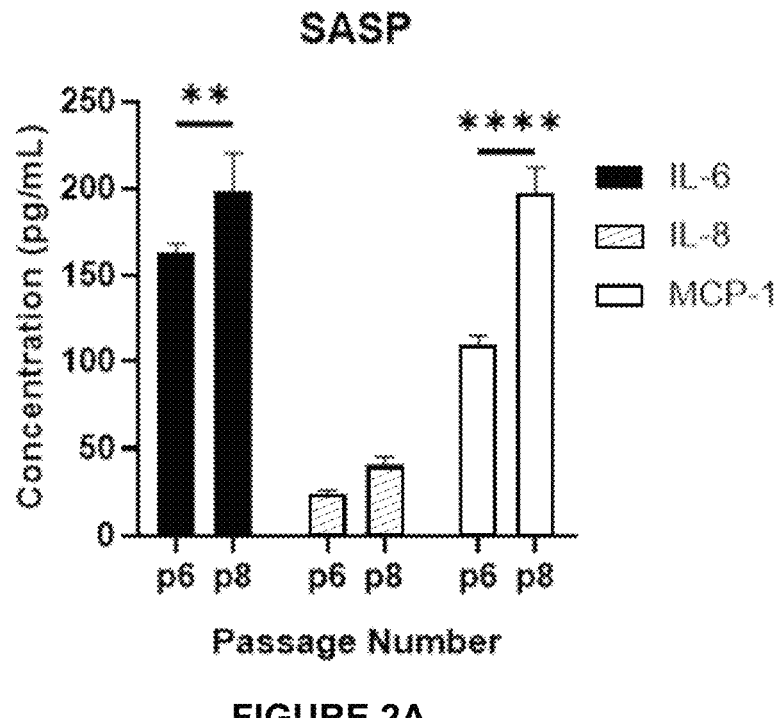
FIG. 2 is a flowchart illustrating an orange peel evaluation process according to the first embodiment.
Figure 2B:
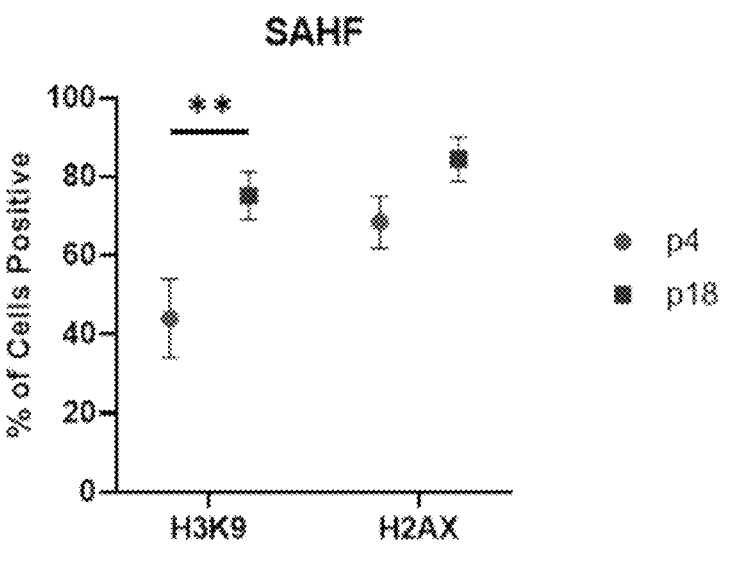
Figure 3:
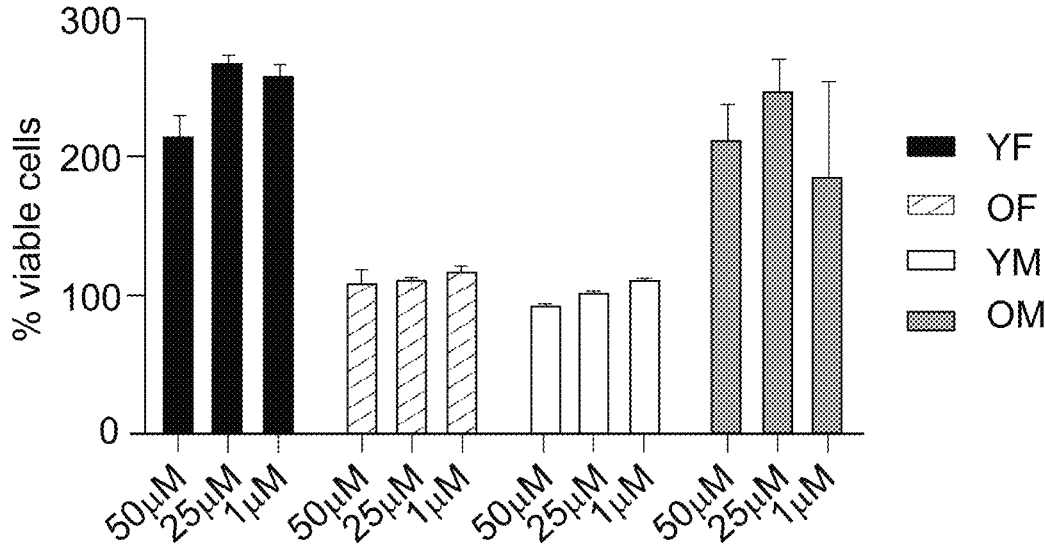
FIGS. 3A, 3B, 3C, and 3D are diagrams illustrating an imaging method.
Figure 4A:
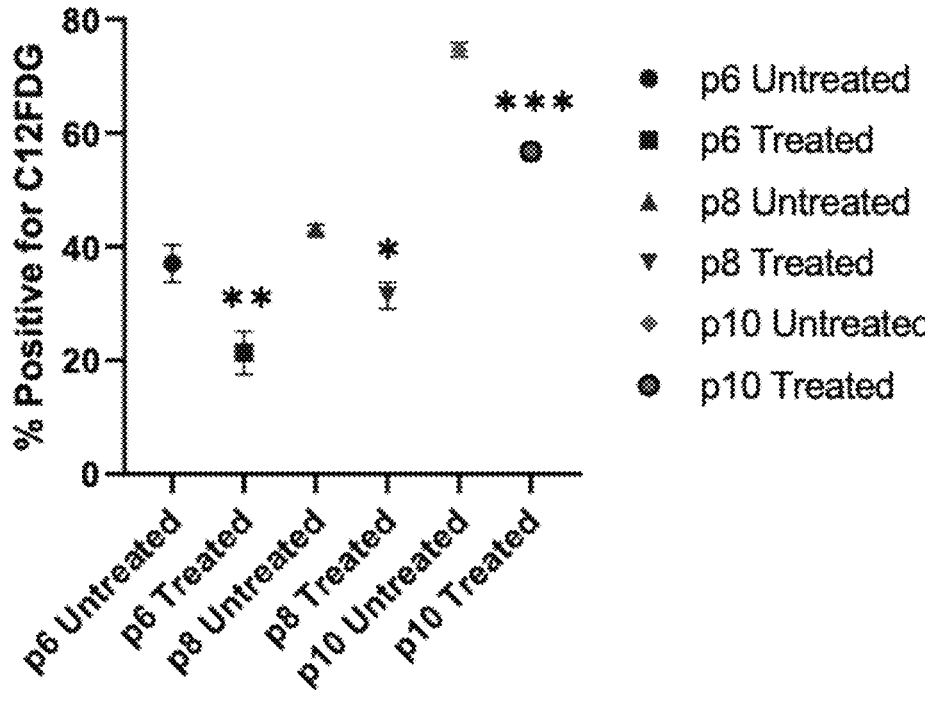
FIG. 4 is a diagram illustrating an example of a user interface (UI).
Figure 4B:
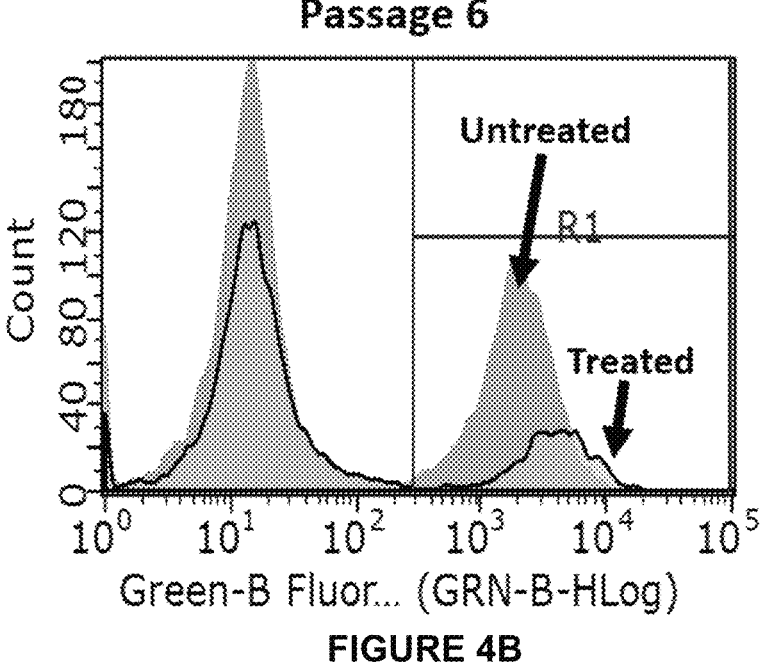
Figure 4C:
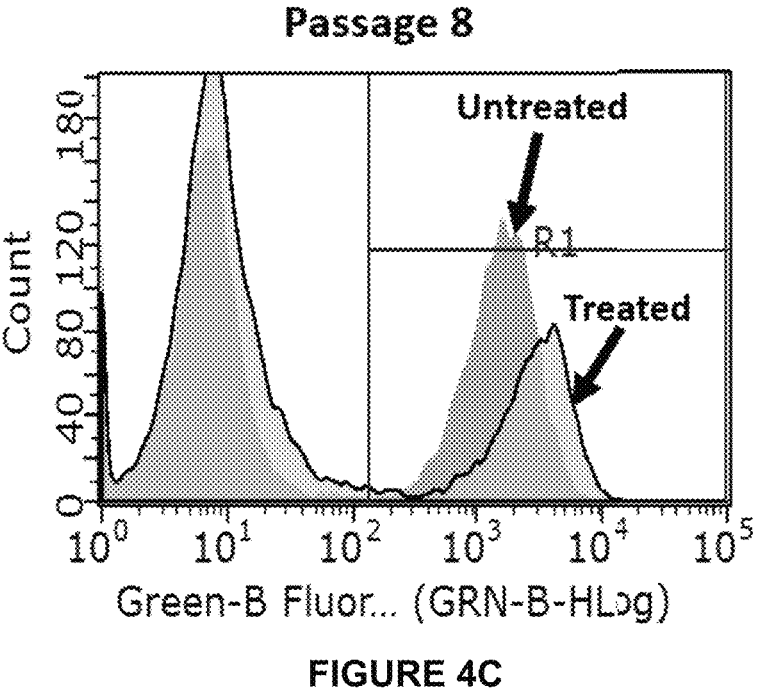
Figure 4D:
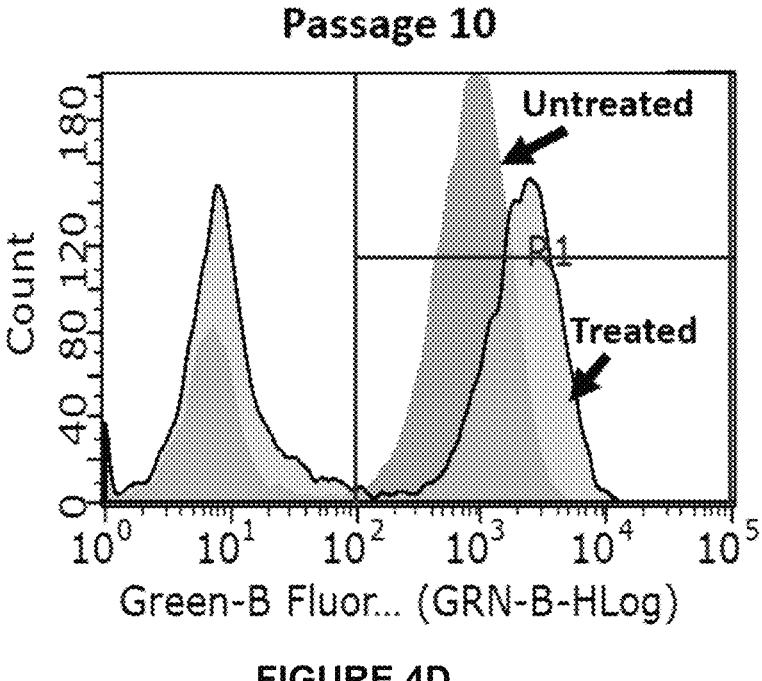

FIG. 2 is a flowchart illustrating all the steps of an orange peel evaluation process according to the present embodiment. In the following description of the flowchart, the notation of "step" will be omitted by adding S at the beginning of each step.

In S201, the display control unit 1007 displays the UI for orange peel evaluation (FIG. 4) on the display 115.

In S202, the image acquisition unit 1001 acquires image data specified on the UI displayed in S201 from the HDD 113. The image data acquired in this step is image data held in advance in the HDD 113, and is image data obtained by capturing an image of an object to be evaluated using an imaging method described later using FIGS. 3A to 3D. This image data contains a plurality of projection images with different line widths formed on the surface of the object to be evaluated. Note that a single captured image need not contain a plurality of projection images. A plurality of captured images captured for a plurality of projection images may be used as image data.

In S203, the line width information acquisition unit 1002 acquires object information of the object to be evaluated in order to obtain line width information suitable for evaluation. The line width information acquisition unit 1002 may acquire object information from a management system that manages objects conveyed on the conveyor line, or may directly acquire object information through an input operation of the user. In the present embodiment, it is assumed that the object information includes the object type and the paint color. Note that the object information is not limited to the object type and the paint color, and may include information about the distance from the object to the imaging device and the distance from the object to the illumination light source. Different object types have different object widths, and hence the distance from the object to the illumination light source will vary. That is, the angular range of incident light relative to the object surface will vary. Furthermore, if the paint colors are different, the bidirectional reflectance distribution function (BRDF) will vary. That is, the angular range of reflected light from the object surface will vary. Accordingly, the luminance distribution of a projection image varies depending on the object type and the paint color.

In S204, the line width information acquisition unit 1002 reads out the line width information data table from the HDD 113 to obtain line width information corresponding to the object information acquired in S203. FIG. 6 illustrates an example of the line width information data table. As illustrated in FIG. 6, the line width information data table holds the correlation between object information (object type and paint color) and line width information.

In S205, the projection image width calculation unit 1003 calculates the line width of each projection image in the image data acquired in S202. The details of the line width calculation process executed in this step will be described later using the flowchart of FIG. 7.

In S206, the projection image selection unit 1004 compares the line width information acquired in S204 with the line width of each projection image calculated in S205, and selects a projection image to be used for evaluation based on the result of the comparison. The details of the projection image selection process executed in this step will be described later using the flowchart of FIG. 9.

In S207, the evaluation value calculation unit 1005 acquires an optical profile of the projection image selected in S206, of the image data acquired in S202, and calculates an evaluation value of orange peel from the optical profile. The details of the evaluation value calculation process executed in this step will be described later using the flowchart of FIG. 10.

In S208, the evaluation value output unit 1006 displays the evaluation value calculated in S207 on the UI displayed in S201. The display control unit 1007 also displays information of the projection image selected in S206 on the UI. Thereafter, the sequential processing of the flowchart ends.

Hereinafter, an imaging method for an object to be evaluated will be described.

FIG. 3A is a diagram schematically illustrating an imaging method for an object 301 to be evaluated. An illumination light source 302 and an imaging device 303 are installed at positions at a distance so as not to contact the object 301 having a certain object width. The illumination light source 302 is assumed to be a linear light source. Under the condition of this installation, projection images 304 are formed by projecting a portion of the illumination light from the illumination light source 302 onto the surface of the object 301. As illustrated in FIG. 3B, because the illumination light from the illumination light source 302 includes a plurality of slit light beams with different line widths, the projection images 304 with different line widths are formed on the surface of the object 301. In the present embodiment, image data obtained by capturing an image of the object 301 including the projection images 304 is used for evaluation. The object 301 is an example of a target object.

If the surface of the object 301 is flat and smooth, the edges of the projection images 304 become straight lines, but if the surface of the object 301 is uneven, the edges of the projection images 304 become jagged lines instead of straight lines. In the present embodiment, the image processing apparatus 1 evaluates the degree of orange peel based on an optical profile obtained from the luminance distribution of the projection images 304. Here, the degree of orange peel represents the degree of roughness of the object surface. Note that it is assumed in the present embodiment that the object to be evaluated is an object whose shape is flat before being painted, and capturing an image to obtain image data is performed after painting in order to evaluate orange peel that occurs by the painting. As long as there is no impact on the evaluation of orange peel that occurs after the painting, the object to be evaluated need not be flat before being painted, and may be substantially flat with subtle irregularities on the surface.

FIG. 3B is a front view representing the appearance of the illumination light source 302. The illumination light source 302 is provided with a plurality of slits 306 to 309 of different widths. Here, the slit 306 is a slit for an object having object width 1, the slit 307 is a slit for an object having object width 2, the slit 308 is a slit for an object having object width 3, and the slit 309 is a slit for an object having object width 4. Different object types (object widths) have different relative positions of the object with the illumination light source and the imaging device, and hence the slit width suitable for evaluation will also vary. For simplicity, an object having object width 1 and an object having object width 2 will be described below.

FIG. 3C is a diagram illustrating the relative positions of the object 301, the imaging device 303, and the illumination light source 302. A conveyor line 310 for an object is a line for conveying the object. An object 301a is an object having object width 1, and the surface of the object 301a is located at distance 312 from the illumination light source 302 in FIG. 3C. Also, an object 301b is an object having object width 2, and the surface of the object 301b is located at distance 314 from the illumination light source 302 in FIG. 3C. In this way, information of the distance of the object from the illumination light source and the imaging device can be acquired from the information of the object type (object width).

FIG. 3D is a diagram illustrating the projection image (positive reflection region) 304 formed on the object 301. In FIG. 3D, let the width direction of the projection image be the y-axis, and a luminance distribution 315 in the y-axis direction of the projection image when the slit light beams are parallel light beams is represented. This luminance distribution 315 has an approximate trend determined for each paint. In practice, because the slit light is diffused light, a luminance distribution 317 convolved by a bokeh function 316 after passing through the slit forms an image on the object surface. Because the characteristics of the bokeh function 316 at this time are determined by the slit width and distance information, the characteristic data of the luminance distribution 317 can be acquired in advance from the paint color, slit width, and distance information.

FIG. 4 is a diagram illustrating an example of a UI according to the present embodiment. An image display window 401 is a window that displays image data as directed by the user. An image selection button 402 is a button that specifies image data that the user directs to display. An object type information text box 403 is a region that displays information of the object type. A paint color information text box 404 is a region that displays paint color information. An evaluation value calculation button 405 is a button for the user to give an instruction to calculate the evaluation value. An evaluation region rectangle 406 is a rectangle indicating the evaluation region. An evaluation value display text box 407 is a region that displays the evaluation value calculated by the evaluation value calculation unit 1005. An end button 408 is a button to end the application.

FIG. 5 is a diagram illustrating a state transition of the UI according to the present embodiment. When the image processing apparatus 1 starts an application for orange peel evaluation in response to a user's instruction, the image processing apparatus 1 enters state 501, where the display control unit 1007 displays the UI in FIG. 4, and then transitions to state 502. In state 502, the display control unit 1007 waits for user input, and, when the display control unit 1007 detects the pressing of the image selection button 402, transitions to state 503. In state 503, the display control unit 1007 displays the object type information in the object type information text box 403 and the paint color information in the paint color information text box 404, and transitions to state 504 after executing the processes in S204 to S207 described above. In states 504 and 505, the display control unit 1007 displays the evaluation region rectangle 406 at the position of the selected projection image and displays the calculated evaluation value in the evaluation value display text box 407, and then transitions to state 502. When the display control unit 1007 detects the pressing of the end button 408, the display control unit 1007 transitions to state 506. In state 506, the image processing apparatus 1 performs operations regarding the termination of the application for orange peel evaluation.

Line Width Calculation Process

Figure 7:
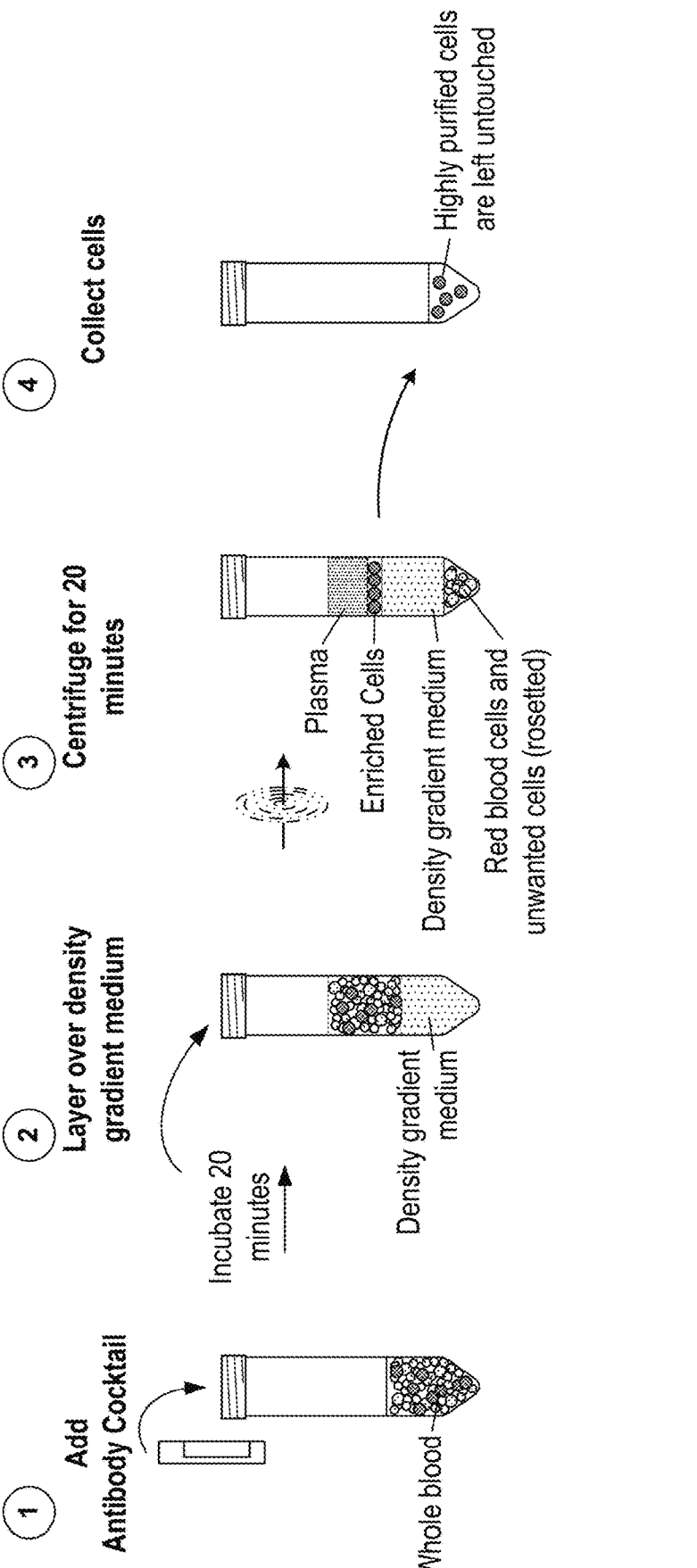
FIG. 7 is a flowchart illustrating the details of a line width calculation process.
Figure 8:
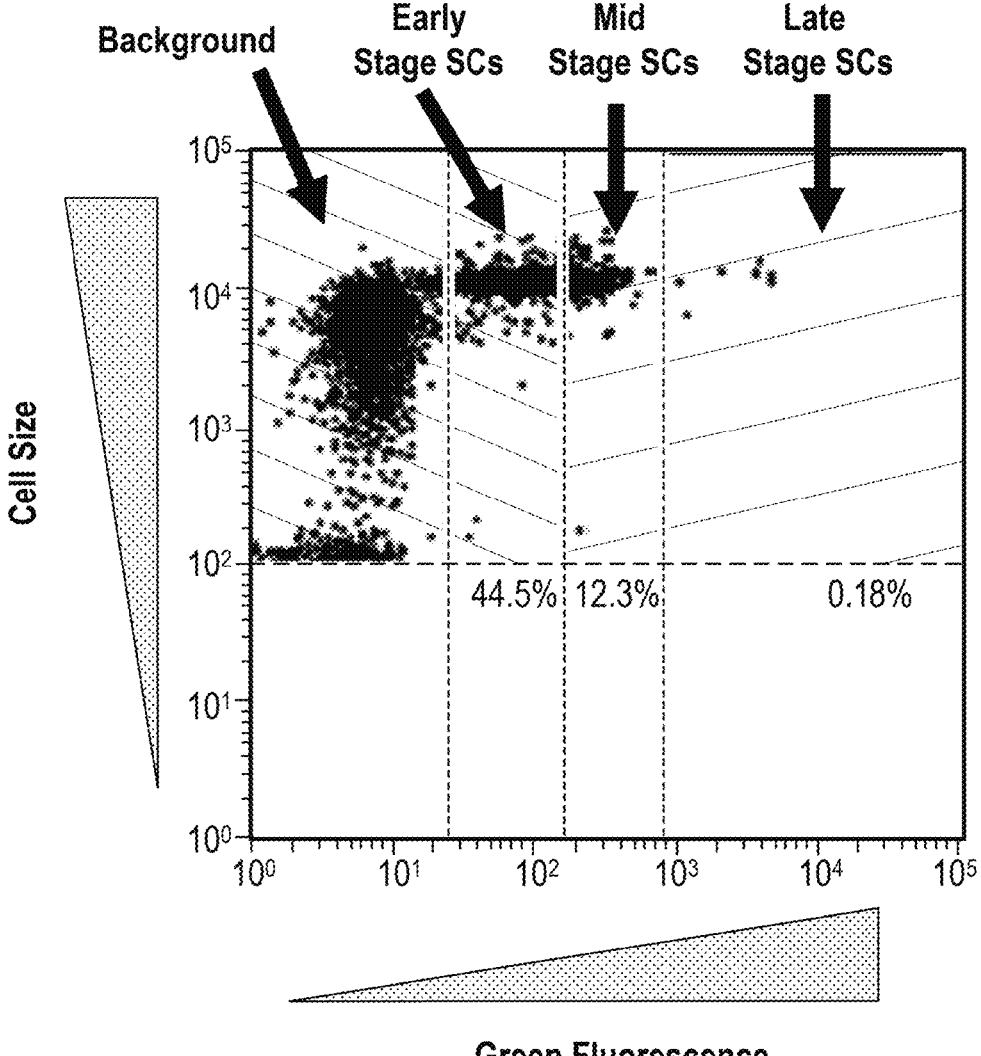
FIGS. 8A, 8B, 8C, and 8D are diagrams illustrating a method of calculating the line width of a projection image.

Hereinafter, the line width calculation process in S205 will be described using FIGS. 7 and 8. FIG. 7 is a flowchart illustrating the line width calculation process.

In S801, the projection image width calculation unit 1003 acquires image data acquired in S202.

In S802, the projection image width calculation unit 1003 binarizes the pixel values of the image data using a certain threshold. As an example, the threshold is the average luminance calculated for the pixels in an evaluation range designation area. In the binarization process in this step, if the pixel value is greater than or equal to the threshold value, the pixel value is set to 0 (black), and if the pixel value is less than the threshold, the pixel value is set to 1 (white). FIG. 8A illustrates the original image of image data 901. In FIG. 8A, the original image contains a projection image 902 for object width 1 and a projection image 903 for object width 2. FIG. 8B illustrates the image data that has been subjected to the binarization process. FIG. 8B illustrates a projection image 904 for object width 1 after the binarization process and a projection image 905 for object width 2 after the binarization process. In addition, the binary image in FIG. 8B includes black pixels 906 with a pixel value of 0 and white pixels 907 with a pixel value of 1. In FIGS. 8A to 8D, let the width direction of the projection image be the y-axis, and let the line direction of the projection image be the x-axis.

In S803, the projection image width calculation unit 1003 detects an edge point (a point where the black/white continuity changes) of the binary image. FIGS. 8C and 8D illustrate enlarged views of a rectangle 908 on the binary image in FIG. 8B. In FIG. 8C, a search is conducted through pixels from an upper-left pixel 909 to a lower-left pixel 910 in the rectangle 908, and a first detected edge point is indicated by a gray pixel 911.

The projection image width calculation unit 1003 searches the pixels in the y-direction for each x-coordinate of the binary image and detects pixels whose pixel values are different from adjacent pixels as edge points. Here, the adjacent pixels are pixels adjacent in the y-direction. For example, for the pixel at the coordinates (X, Y), the adjacent pixels are the pixel at the coordinates (X, Y−1) and the pixel at the coordinates (X, Y+1). Let xj be the x coordinate for which a search for edge points is conducted, then the coordinates of the i-th edge point are (xj, yi). In this step, a group of i-th edge points is detected. In the example of FIG. 8C, a group of pixels at the upper end of the edge of the projection image 904 has been detected.

In S804, the projection image width calculation unit 1003 detects edge points in the same manner as in S803. In this step, a group of (i+1)-th edge points is detected. In FIG. 8D, a search is conducted through pixels from the upper-left pixel 909 to the lower-left pixel 910 in the rectangle 908, and a second detected edge point is indicated by a gray pixel 912. Let xj be the x coordinate for which a search for edge points is conducted, then the coordinates of the (i+1)-th edge point are (xj, yi+1). In the example of FIG. 8D, a group of pixels at the lower end of the edge of the projection image 904 has been detected.

In S805, the projection image width calculation unit 1003 calculates a line width wj for xj from the following equation (1). The projection image width calculation unit 1003 further calculates a line width w for each x-coordinate of the binary image.

$$w_j = y_{i+1} - y_i \tag{1}$$

In S806, the projection image width calculation unit 1003 averages the line widths w calculated in S805 to find the average width.

In S807, the projection image width calculation unit 1003 determines whether the average width has been calculated for all projection images in the binary image. If the projection image width calculation unit 1003 determines that there is a projection image for which no average width has been calculated, i is set to i+2, and the process transitions to S803. As a result, the next projection image is subjected to the calculation of the average width. If the projection image width calculation unit 1003 determines that the average width has been calculated for all projection images, the sequential processing of the flowchart ends.

According to the above line width calculation process, the average distance between the upper end of the edge and the lower end of the edge of each projection image in the image data acquired in S202 can be calculated as the line width.

Projection Image Selection Process

Figure 9A:
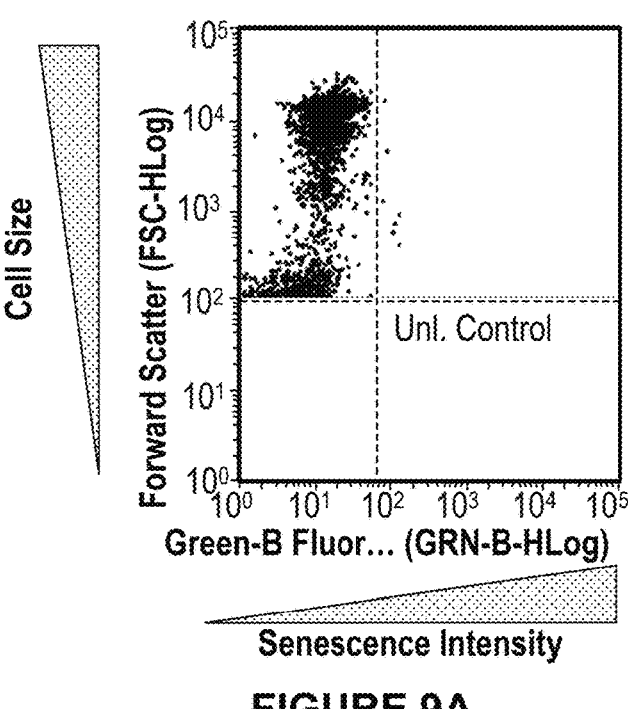
FIG. 9 is a flowchart illustrating the details of a projection image selection process.
Figure 9B:
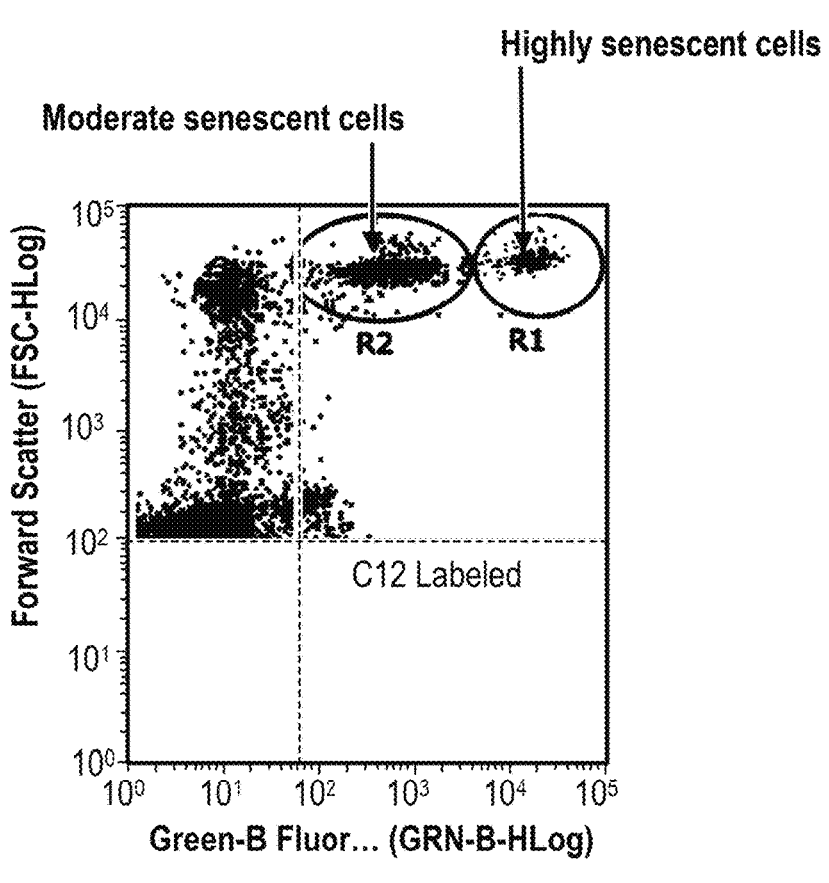
Figure 9C:
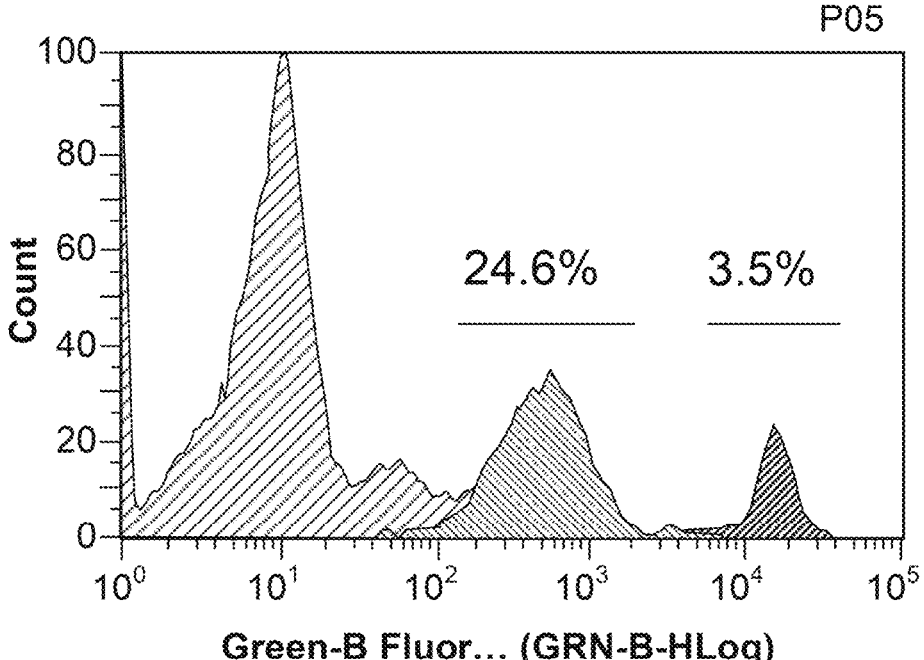

Hereinafter, the projection image selection process in S206 will be described using FIG. 9. FIG. 9 is a flowchart illustrating the projection image selection process.

In S1001, the projection image selection unit 1004 acquires line width information Wref corresponding to the object information. This step is the same as the processing in S204.

In S1002, the projection image selection unit 1004 acquires the line width (average width) of each projection image calculated in S205.

In S1003, the projection image selection unit 1004 calculates a difference ΔWi between the line width information Wref acquired in S1001 and the line width (average width) of the i-th projection image using the following equation (2).

$$\Delta w_i = |w_i - w_{ref}| \qquad (2)$$

In S1004, the projection image selection unit 1004 determines whether the difference ΔWi has been calculated for the line width of all projection images. If the projection image selection unit 1004 determines that there is a projection image for which no difference ΔWi has been calculated, the projection image selection unit 1004 increments i for the next projection image and transitions the process to S1003. If the projection image selection unit 1004 determines that the difference ΔWi has been calculated for the line width of all projection images, the sequential processing of the flow-chart ends.

In S1005, the projection image selection unit 1004 selects a projection image corresponding to i whose difference ΔWi is the smallest as a projection image to be used for evaluation.

According to the projection image selection process as described above, a projection image projected at a slit width corresponding to the object information can be identified from among a plurality of projection images in the image data acquired in S202.

Evaluation Value Calculation Process

Figure 10A:
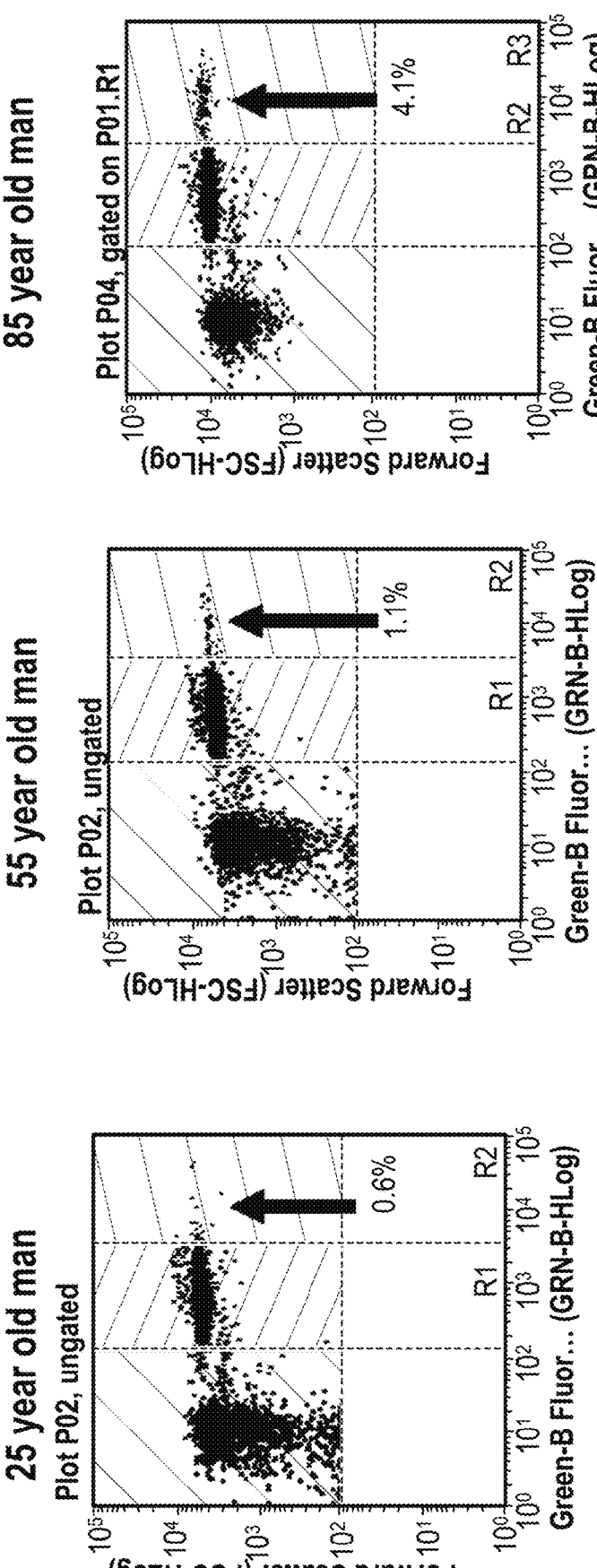
FIG. 10 is a flowchart illustrating the details of an evaluation value calculation process.
Figure 10B:
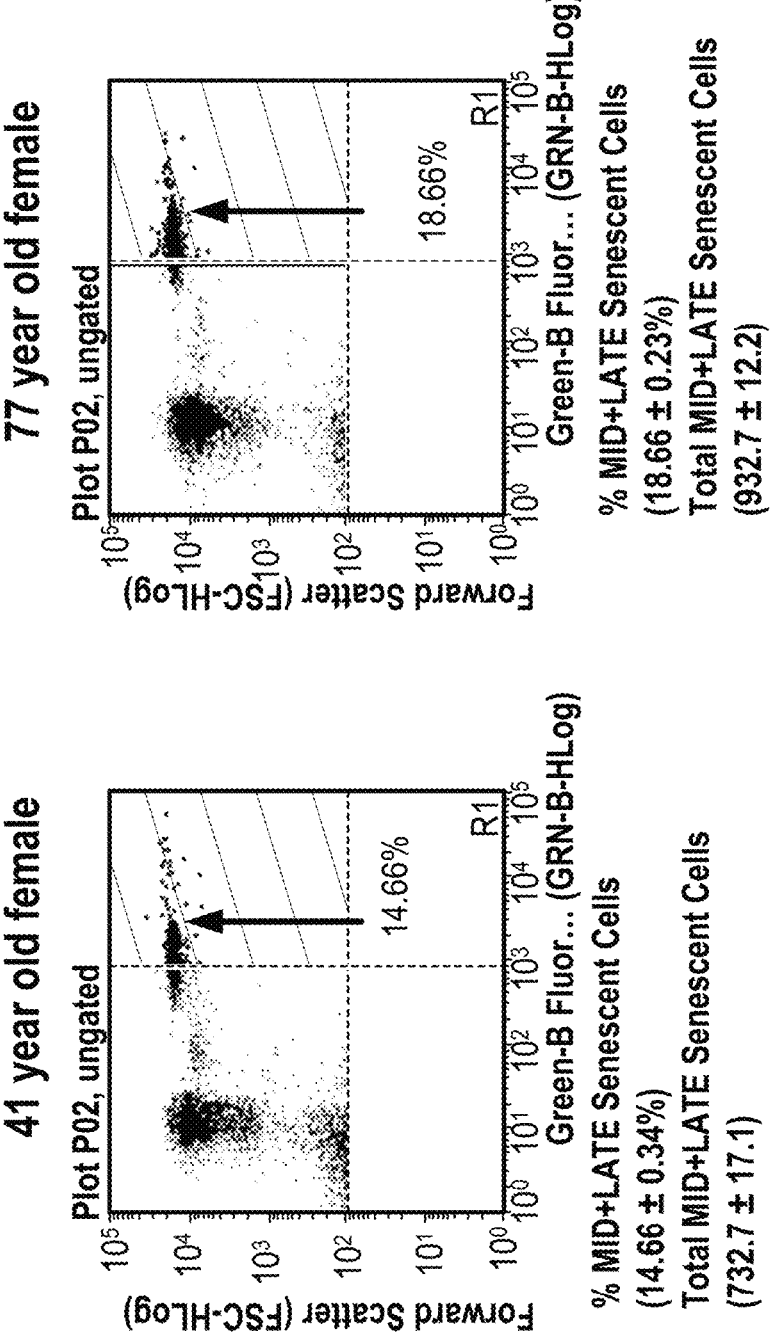

Hereinafter, the evaluation value calculation process in S207 will be described using FIGS. 10 to 12. FIG. 10 is a flowchart illustrating the evaluation value calculation process.

In S1101, the evaluation value calculation unit 1005 acquires the image data acquired in S202 and sets a rectangle (evaluation region rectangle) representing an evaluation region in the projection image selected in S206.

Figure 11A:
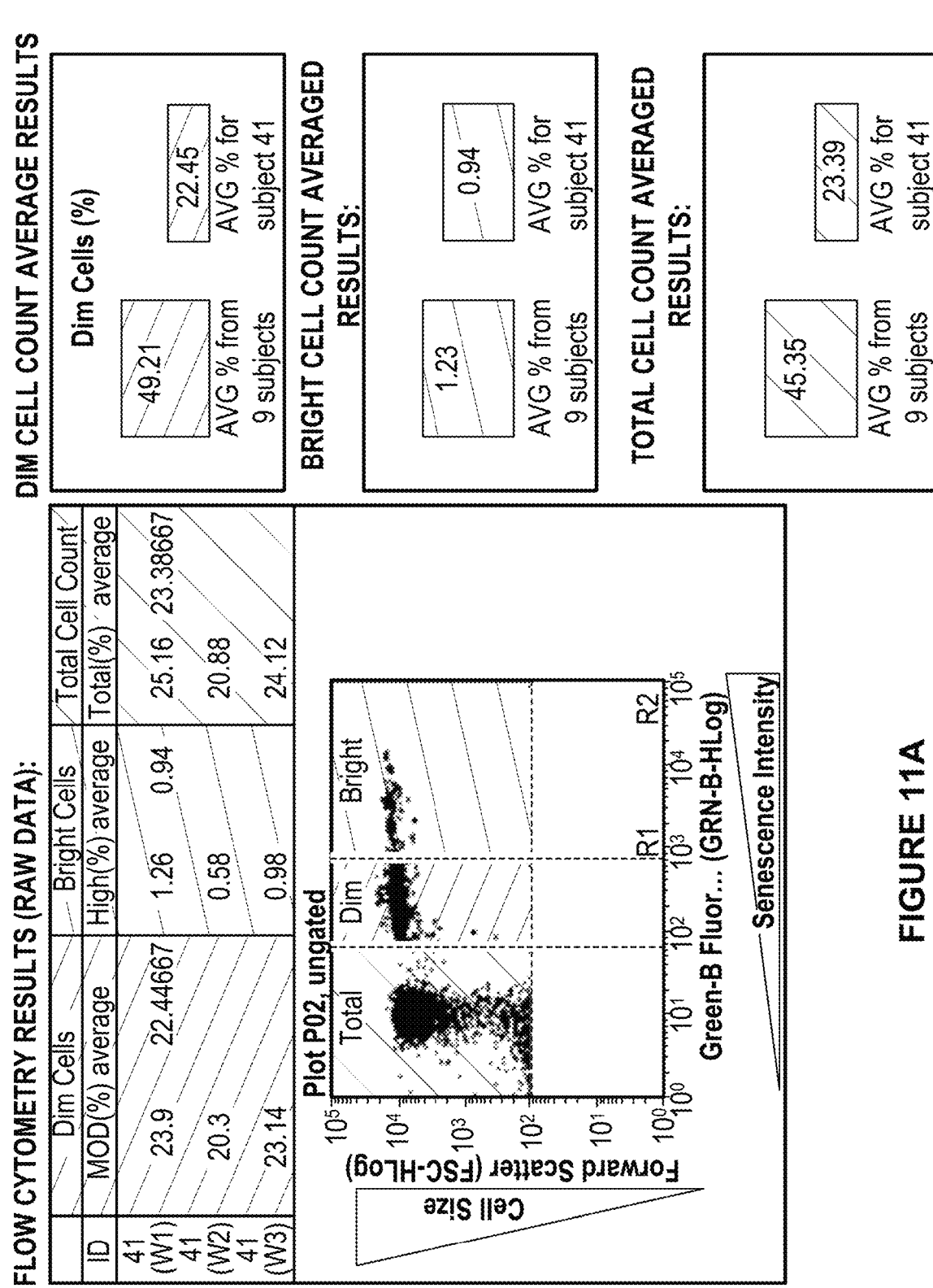
FIGS. 11A and 11B are diagrams illustrating a method of calculating an evaluation value.

FIG. 11A is a diagram illustrating a rectangle to be set. It will be described hereinafter that FIG. 11A illustrates the image data 901 that has been subjected to the binarization process, and it is assumed that the projection image 904 in FIG. 11A has been selected.

Let the coordinates of an upper-left pixel 1202 in a rectangle 1201 be (xl1, yl1), and the coordinates of a lower-right pixel 1203 be (xr1, yr1). Let the coordinates of an upper-left pixel 1204 in the projection image 904 be (xl2, yl2), and the coordinates of a lower-right pixel 1205 be (xr2, yr2). Moreover, let the coordinates of a lower-left pixel in a projection image prior to the selected projection image or a pixel 1206 located at the upper-left image end be (xr2, yu), and let the coordinates of an upper-left pixel 1207 in a projection image subsequent to the selected projection image or a pixel located at the lower-left image end be (xr2, yd). At this time, the evaluation value calculation unit 1005 sets the coordinates (xl1, yl1) of the upper-left pixel 1202 and the coordinates (xr1, yr1) of the lower-right pixel 1203 in the rectangle 1201 using the following equations (3) to (6).

$$x_{l1} > x_{l2} \qquad (3)$$

$$y_{l1} = (y_{l2} - y_u)/2 \qquad (4)$$

$$x_{r1} < x_{r2} \qquad (5)$$

$$y_{r1} = (-y_{r2} + y_d)/2 \qquad (6)$$

In S1102, the evaluation value calculation unit 1005 binarizes the pixel values of the image data using a certain threshold as in S802. As an example, the threshold is the average luminance calculated for the pixels in the evaluation region rectangle. Note that the processing in this step may be executed before S1101.

Figure 11B:
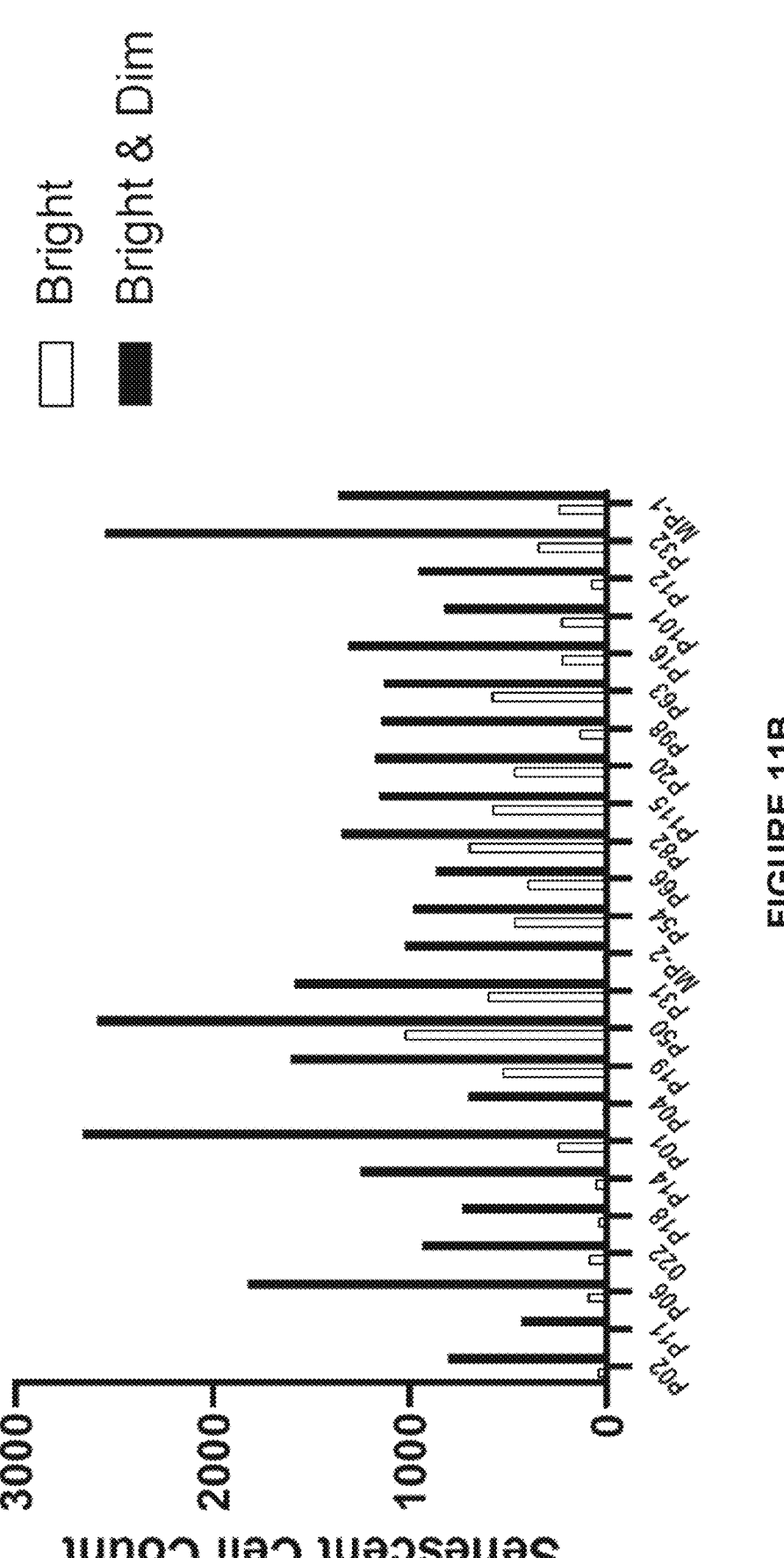

In S1103, the evaluation value calculation unit 1005 calculates a regression line using a known least squares method for a group of pixels that have become white pixels after the binarization in the evaluation region rectangle. Specifically, using the x-coordinate and y-coordinate data-sets of the pixels that have become white pixels after the binarization, a and b (where y=ax+b) are calculated by the least squares method. In this way, the evaluation value calculation unit 1005 calculates an approximate line along the line direction of the projection image 904. FIG. 11B illustrates an enlarged view of the rectangle 1201. The binary image in FIG. 11B includes black pixels 1208 with a pixel value of 0 and white pixels 1209 with a pixel value of 1. A line indicated by gray pixels 1210 represents a regression line of the projection image 904. Note that an approximate line at the upper end of the edge or an approximate line at the lower end of the edge may be calculated as a regression straight line.

In S1104, the evaluation value calculation unit 1005 calculates a luminance value $Y_i$ from the pixels on the regression line calculated in S1103 using the following equation (7). In the following equation (7), it is assumed that the x position of the regression line is represented by i. FIG. 12 schematically illustrates data (optical profile) of the luminance value on the regression line. The sampling position in FIG. 12 corresponds to the position of each pixel in the x-direction on the regression line. Note that, in the case where the evaluation value calculation unit 1005 calculates the approximate line at the end of the edge as a regression line, the luminance value $Y_i$ is calculated from the pixels on the approximate line using the following equation (7).

$$Y_i = a_1 \times R_i + a_2 \times G_i + a_3 \times B_i \qquad (7)$$

Note that each symbol in the above equation (7) represents the following:
i: number representing x position;
Ri, Gi, and Bi: RGB values before the binarization of pixels at position i (xi) on the regression line; and
a1, a2, and a3: arbitrary coefficients (vary depending on the type of RGB color space used in the image).

In S1105, the evaluation value calculation unit 1005 performs frequency conversion on the optical profile calculated in S1104.

In S1106, the evaluation value calculation unit 1005 calculates the integral over a certain frequency section as an evaluation value.

$$P_{eva} = \sum_{f1}^{f2} amp \qquad (8)$$

Note that each symbol in the above equation (8) represents the following:
Peva: evaluation value;
amp: amplitude of frequency;
f1: lower frequency limit of the integration section; and
f2: upper frequency limit of the integration section.

Note that, as an example of the certain frequency section, frequencies corresponding to the actual size of the object can be used, such as f1=0.1 cyc/mm and f2=1.0 cyc/mm. Needless to say, it is possible to set a section by specifying arbitrary frequencies, as well as setting a plurality of sections.

As described above, the image processing system according to the present embodiment acquires image data obtained by capturing an image of the surface of an object in which a plurality of projection images with different line widths are contained, and selects a projection image to be used for evaluation based on object information from among the plurality of projection images in the image data. Then, an orange peel evaluation value on the surface of the object is calculated based on an optical profile calculated from the luminance distribution of the selected projection image. As a result, the projection image used for evaluation can be changed according to the object information, such as the object type (object width) and the paint color, and hence the orange peel on the surface of the object can be accurately evaluated.

Modification of First Embodiment

In the present embodiment, the luminance information on the regression line of the projection image 904 is utilized as the optical profile. Note that not only the luminance information, but also distance information based on the distance between the approximate line at the end of the edge and the edge (a point where the black/white continuity changes) can also be utilized.

In addition, in the present embodiment, the method of performing frequency conversion of an optical profile and using the integral value of a certain section as an evaluation value has been described. Note that the evaluation value is not limited to data based on frequency conversion, and may be data based on a variation amount. The evaluation value calculation unit 1005 may evaluate the orange peel based on the amount of variation of the calculated luminance information. When the degree of orange peel is small, the variation of luminance information becomes small. Accordingly, the evaluation value calculation unit 1005 calculates an evaluation value whose value becomes 0 when there is no variation in the luminance information, and whose value increases as the variation amount increases. The evaluation value here can be calculated using the following equation (9).

$$P_{eva} = \sum_{i=y_{st}}^{y_{ed}} l_i \qquad (9)$$

Note that each symbol in the above equation (9) represents the following:
Peva: evaluation value;
i: sampling position;
yst: origin of the sampling position;
yed: end of the sampling position; and
li: luminance information at i (optical profile value).

Also, in the present embodiment, the image acquisition unit 1001 acquires image data from the HDD 113, but may alternatively acquire image data directly from the imaging device 111.

Moreover, in the present embodiment, the illumination light source 302 projects slit light onto the surface of the object 301, but the illumination light source 302 is an example of a projection unit, and the projection unit is not limited to the illumination light source 302. For example, using a directional linear light source as the projection unit, linear projection images may be formed on the surface of the object 301. In this case, the evaluation value calculation unit 1005 calculates the evaluation value by utilizing the edge of a region illuminated with the strong light of the linear light source. Also, a shield or a slit-shaped optical system adjusted to form linear projection images may be used as the projection unit. Also, a display or a projector adjusted to project patterned light of a plurality of line width patterns may be used as the projection unit.

In addition, in the present embodiment, the image processing apparatus 1 performs a binarization process using an average luminance value as a threshold, but the method of a binarization process is not limited thereto. For example, binarization may be performed using a certain threshold determined in advance, or binarization may be performed using any known method, such as Otsu's method using a histogram of pixel values.

In addition, in the present embodiment, the image processing apparatus 1 displays the calculated evaluation value on the display 115, but the method of outputting the evaluation value is not limited to the method of displaying the evaluation value on the display 115.

For example, the calculated evaluation value may be held in a storage device such as the HDD 113. In addition, painting information, such as environmental information when the object has been painted and the painting method, may be associated with the evaluation value and held in a storage device such as the HDD 113. The image processing apparatus 1 may then list and display the painting information and its corresponding evaluation values. This enables the user to easily know the painting method and painting environment where it is difficult for orange peel to develop.

Also, in the present embodiment, although the surface shape of the object to be evaluated is assumed to be flat, the surface shape may be curved. In this case, the projection images 304 generated on the surface of the object are curved, and, in S1103, curve approximation is performed by a polynomial approximation rather than a linear approximation, or by an approximation method using a spline curve or Bezier curve.

Second Embodiment

In the first embodiment, the method of selecting a projection image corresponding to an object of a different object type (object width) conveyed on the conveyor line has been described. In the meanwhile, even if an object has the same object width, the relative position of the object with the illumination light source and the imaging device may fluctuate due to errors in the attachment position to the conveyor line. Accordingly, in a second embodiment, a method of acquiring distance information representing a positional deviation from the reference attachment position of an object and selecting a projection image corresponding to the acquired distance information will be described. Note that descriptions of portions of the second embodiment that are the same as or similar to those of the first embodiment will be omitted, and portions of the second embodiment that are different from those of the first embodiment will be mainly described hereinafter. Configurations in the second embodiment that are the same as those in the first embodiment will be described using the same reference numerals.

Functional Configuration of Image Processing Apparatus 1

FIG. 13 is a diagram illustrating the functional configuration of the image processing apparatus 1. The image processing apparatus 1 includes an image acquisition unit 1401, a line width information acquisition unit 1402, a projection image width calculation unit 1403, a distance information calculation unit 1404, a projection image selection unit 1405, an evaluation value calculation unit 1407, an evaluation value output unit 1408, and a display control unit 1409. The functional configuration of the second embodiment differs from that of the first embodiment in the point that the distance information calculation unit 1404 is added.

The distance information calculation unit 1404 calculates distance information representing a positional deviation from reference distance information representing the reference attachment position of an object. The projection image selection unit 1405 obtains line width information suitable for evaluation based on the distance information. The HDD 113 stores a line width information data table corresponding to the distance information as illustrated in FIG. 15. The line width information data table in FIG. 15 holds line width information in association with object information and distance information. In the present embodiment, the projection image selection unit 1405 acquires line width information corresponding to the object information and the distance information from the line width information data table. Note that, in the case where the attachment position of the object is slightly deviated, the width of change in the relative position with the illumination light source and the imaging device is smaller than that in the case where the object width is different. Accordingly, the degree of change in the line width information corresponding to the distance information is made smaller than the degree of change in the line width information corresponding to the object information.

Processing Executed by Image Processing Apparatus 1

FIG. 14 is a flowchart illustrating all the steps of an orange peel evaluation process according to the present embodiment.

In S1501, the display control unit 1409 displays the UI for orange peel evaluation (FIG. 4) on the display 115.

In S1502, the image acquisition unit 1401 acquires image data specified on the UI displayed in S201 from the HDD 113.

In S1503, the line width information acquisition unit 1402 acquires object information of an object to be evaluated in order to obtain line width information suitable for evaluation.

In S1504, the line width information acquisition unit 1402 acquires reference line width information to be used when evaluating an object of the object information acquired in S1503 at a reference attachment position. The line width information acquisition unit 1402 also acquires reference distance information representing the reference attachment position of the object of the object information acquired in S1503. The reference distance information represents, for example, a distance condition that is established among the object 301, the illumination light source 302, and the imaging device 303 in the case where the object 301 with the object width is attached at the reference attachment position. Note that the reference line width information and the reference distance information are stored in the HDD 113 for each item of object information, and the line width information acquisition unit 1402 reads out information corresponding to the object information acquired in S1503.

In S1505, the projection image width calculation unit 1403 calculates the line width of each projection image in the image data acquired in S1502. The details of the line width calculation process executed in this step are the same as or similar to the flowchart of FIG. 7.

In S1506, the distance information calculation unit 1404 selects a projection image serving as a reference from among the projection images whose line widths are calculated in S1505. Then, the distance information calculation unit 1404 calculates a distance D using the following equation (10) from the calculated value of the line width of the projection image serving as a reference, and the reference line width information and reference distance information acquired in S1504. The distance D represents information of a positional deviation from the reference attachment position. Note that, as an example of a projection image serving as a reference, it is assumed that a projection image located on the uppermost side in the image is used, but any projection image can be set as a reference. In this way, the distance information calculation unit 1404 calculates distance information representing an error of the attachment position of the object based on the ratio of the calculated value of the line width of the projection image serving as a reference to the reference line width information.

$$D = D_w \times \frac{w}{w_b} \tag{10}$$

Note that each symbol in the above equation 10 represents the following:

D: distance information;

w: calculated value of the line width of the projection image serving as a reference;

Dw: reference distance information; and wb: reference line width information.

In S1507, the projection image selection unit 1405 reads out a line width information data table corresponding to the distance information in FIG. 15 from the HDD 113 to obtain line width information corresponding to the object information acquired in S1503 and the distance information calculated in S1506.

In S1508, the projection image selection unit 1405 compares the line width information acquired in S1507 with the line width of each projection image calculated in S1505 and selects a projection image to be used for evaluation.

In S1509, the evaluation value calculation unit 1407 calculates the evaluation value of the orange peel. The details of the evaluation value calculation process executed in this step are the same as or similar to the flowchart of FIG. 10.

In S1510, the evaluation value output unit 1408 outputs the evaluation value to the display 115. The display control unit 1409 also displays information of the projection image selected in S1508 on the UI. Thereafter, the sequential processing of the flowchart ends.

As described above, the image processing system according to the present embodiment calculates distance information representing an error of the attachment position of an object based on the ratio of the calculated value of the line width of a projection image serving as a reference to reference line width information. Then, a projection image to be used for evaluation is selected based on the calculated distance information. This makes it possible to change the projection image used for evaluation according to an error of the attachment position when the object is attached onto the conveyor line, thereby accurately evaluating the orange peel on the surface of the object.

Modification of Second Embodiment

In the present embodiment, the image processing apparatus 1 calculates distance information based on the ratio of the calculated value of the line width of a projection image serving as a reference to reference line width information, but the method of acquiring distance information is not limited to this method. For example, the image processing apparatus 1 may calculate distance information based on an image of an overhead camera capturing an image of the positional relationship among the object 301, the illumination light source 302, and the imaging device 303 from an overhead perspective, and the output values from various sensors.

Third Embodiment

In the above-described embodiments, the method of selecting a projection image corresponding to object information and the method of selecting a projection image corresponding to an error of the attachment position onto the conveyor line have been described. In the meanwhile, on the actual conveyor line, objects with different object widths and paints are conveyed with respective attachment errors, which means that many projection images with different line widths are required. Accordingly, in a third embodiment, a slit pattern of an illumination light source for efficiently arranging a plurality of projection images with different line widths in image data will be described. Note that descriptions of portions of the third embodiment that are the same as or similar to those of the first embodiment will be omitted, and portions of the third embodiment that are different from those of the first embodiment will be mainly described hereinafter. Configurations in the third embodiment that are the same as those in the first embodiment will be described using the same reference numerals.

Slit Pattern of Illumination Light Source

FIG. 16A illustrates an example of a front view representing the appearance of an illumination light source according to the present embodiment. In FIG. 16A, slits 1802 to 1805 are slits for an object having object width 1, and each of the slits 1802 to 1805 corresponds to an error of the attachment position onto the conveyor line. Moreover, slits 1806 to 1809 are slits for an object having object width 2, and each of the slits 1806 to 1809 corresponds to an error of the attachment position onto the conveyor line. In FIG. 16A, slits with certain lengths whose line widths are gradually changed are arranged adjacent to one another in the length direction, with their center lines in the width direction being matched.

FIG. 16B illustrates an example of a front view representing the appearance of an illumination light source according to the present embodiment. In FIG. 16B, slits 1810 to 1813 are slits for an object having object width 1, and each of the slits 1810 to 1813 corresponds to an error of the attachment position onto the conveyor line. Moreover, slits 1814 to 1817 are slits for an object having object width 2, and each of the slits 1814 to 1817 corresponds to an error of the attachment position onto the conveyor line. In FIG. 16B, slits with certain lengths whose line widths are gradually changed are arranged adjacent to one another in the length direction, with their edge lines on one side being matched. By arranging the slits in this way, the impact of reflected light from adjacent projection images can be reduced.

In the present embodiment, by using the illumination light source having the slit pattern illustrated in FIG. 16A, image data can be obtained in which projection images with certain lengths whose line widths are gradually changed are arranged adjacent to one another in the length direction, with their center lines in the width direction being matched.

Similarly, by using the illumination light source having the slit pattern illustrated in FIG. 16B, image data can be obtained in which projection images with certain lengths whose line widths are gradually changed are arranged adjacent to one another in the length direction, with their edge lines on one side being matched.

As described above, in the image processing system according to the present embodiment, image data in which a plurality of projection images are continuously arranged can be used, and the efficiency of processing can be improved.

According to the present disclosure, the orange peel on the surface of an object can be accurately evaluated.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-163433, which was filed on Oct. 11, 2022 and which is hereby incorporated by reference herein in its entirety.

What is claimed is:

1. An image processing apparatus comprising:
one or more memories; and
one or more processors, wherein the one or more processors and the one or more memories are configured to:
acquire an image obtained by capturing a plurality of linear images with different line widths generated on a surface of an object, wherein each of the plurality of linear images is a reflected image of a light source on the object;
acquire line width information based on information about the object;

select, based on the line width information, a linear image from among the plurality of linear images in the image; and evaluate a state of the surface of the object based on the selected linear image.

2. The image processing apparatus according to claim 1, wherein the one or more processors and the one or more memories are further configured to:

calculate a line width of each of the plurality of linear images, and perform a comparison between a calculated line width and a line width represented by the line width information, and select a linear image based on a result of the comparison.

3. The image processing apparatus according to claim 1, wherein information about the object is information representing a type of the object.

4. The image processing apparatus according to claim 1, wherein information about the object is information about paint painted on the object.

5. The image processing apparatus according to claim 1, wherein information about the object is information about at least one of a distance between the object and an imaging device that has captured the image and a distance between the object and a light source that has generated the linear images.

6. The image processing apparatus according to claim 1, wherein the one or more processors and the one or more memories are further configured to acquire the line width information using a data table representing a correlation between information about the object and line width information.

7. The image processing apparatus according to claim 1, wherein the one or more processors and the one or more memories are further configured to calculate an evaluation value based on a luminance distribution of pixels corresponding to the selected linear image.

8. The image processing apparatus according to claim 7, wherein the one or more processors and the one or more memories are further configured to calculate an approximate line along a line direction of the linear image and calculate an evaluation value based on a luminance distribution of pixels on the calculated approximate line.

9. The image processing apparatus according to claim 1, wherein the one or more processors and the one or more memories are further configured to acquire positional deviation information representing a positional deviation from a reference attachment position of the object, and acquire line width information according to the positional deviation information.

10. The image processing apparatus according to claim 9, wherein the one or more processors and the one or more memories are further configured to calculate a line width of a reference linear image in the image, and calculate the positional deviation information based on a ratio of the calculated line width of the reference linear image to a line width represented by line width information used in evaluating the object at the reference attachment position.

11. The image processing apparatus according to claim 1, wherein linear images with certain lengths whose line widths are gradually changed are arranged adjacent to one another in a line direction, with their center lines in a width direction being matched.

12. The image processing apparatus according to claim 1, wherein linear images with certain lengths whose line widths are gradually changed are arranged adjacent to one another in a line direction, with their edge lines on one side being matched.

13. The image processing apparatus according to claim 1, wherein the one or more processors and the one or more memories are further configured to apply control to display information of the selected linear image and a result of the evaluation on a display.

14. An image processing method comprising:

acquiring an image obtained by capturing a plurality of linear images with different line widths generated on a surface of an object, wherein each of the plurality of linear images is a reflected image of a light source on the object;

acquiring line width information based on information about the object;

selecting, based on the line width information, a linear image from among the plurality of linear images in the image; and evaluating a state of the surface of the object based on the selected linear image.

15. A non-transitory computer-readable storage medium storing instructions that, when executed by a computer, cause the computer to perform an image processing method, the image processing method comprising:

acquiring an image obtained by capturing a plurality of linear images with different line widths generated on a surface of an object, wherein each of the plurality of linear images is a reflected image of a light source on the object;

acquiring line width information based on information about the object;

selecting, based on the line width information, a linear image from among the plurality of linear images in the image; and evaluating a state of the surface of the object based on the selected linear image.

* * * * *